H. D. CHURCH.
MOTOR VEHICLE.
APPLICATION FILED MAY 6, 1916.
1,374,058.
Patented Apr. 5, 1921.
2 SHEETS—SHEET 2.
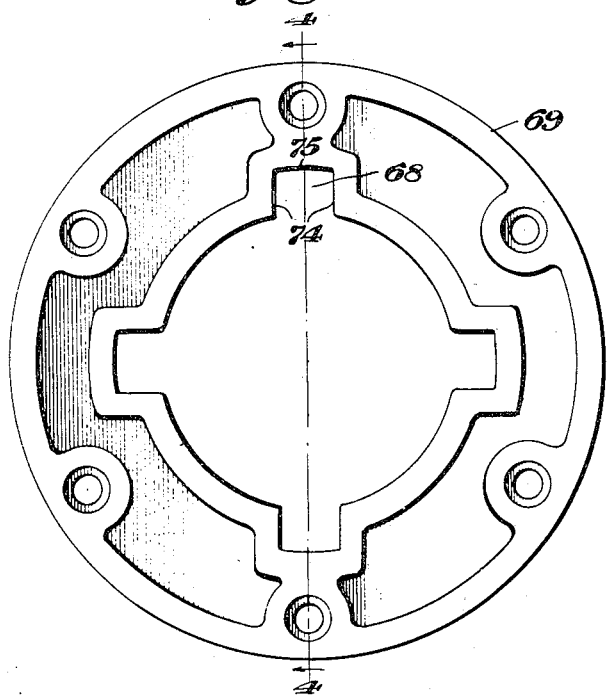
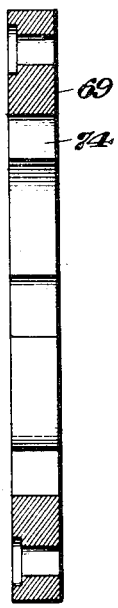
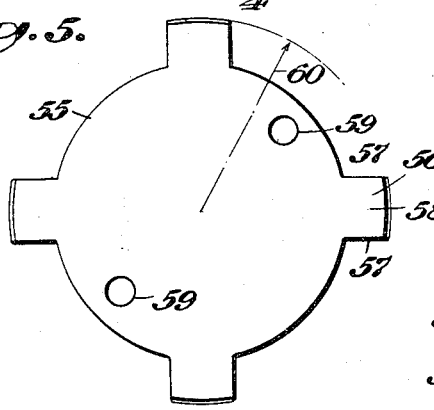
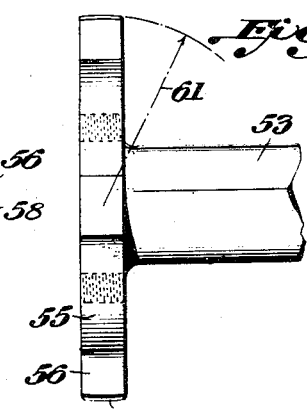
Inventor
Harold D. Church,
By Millon Tibbetts
Attorney

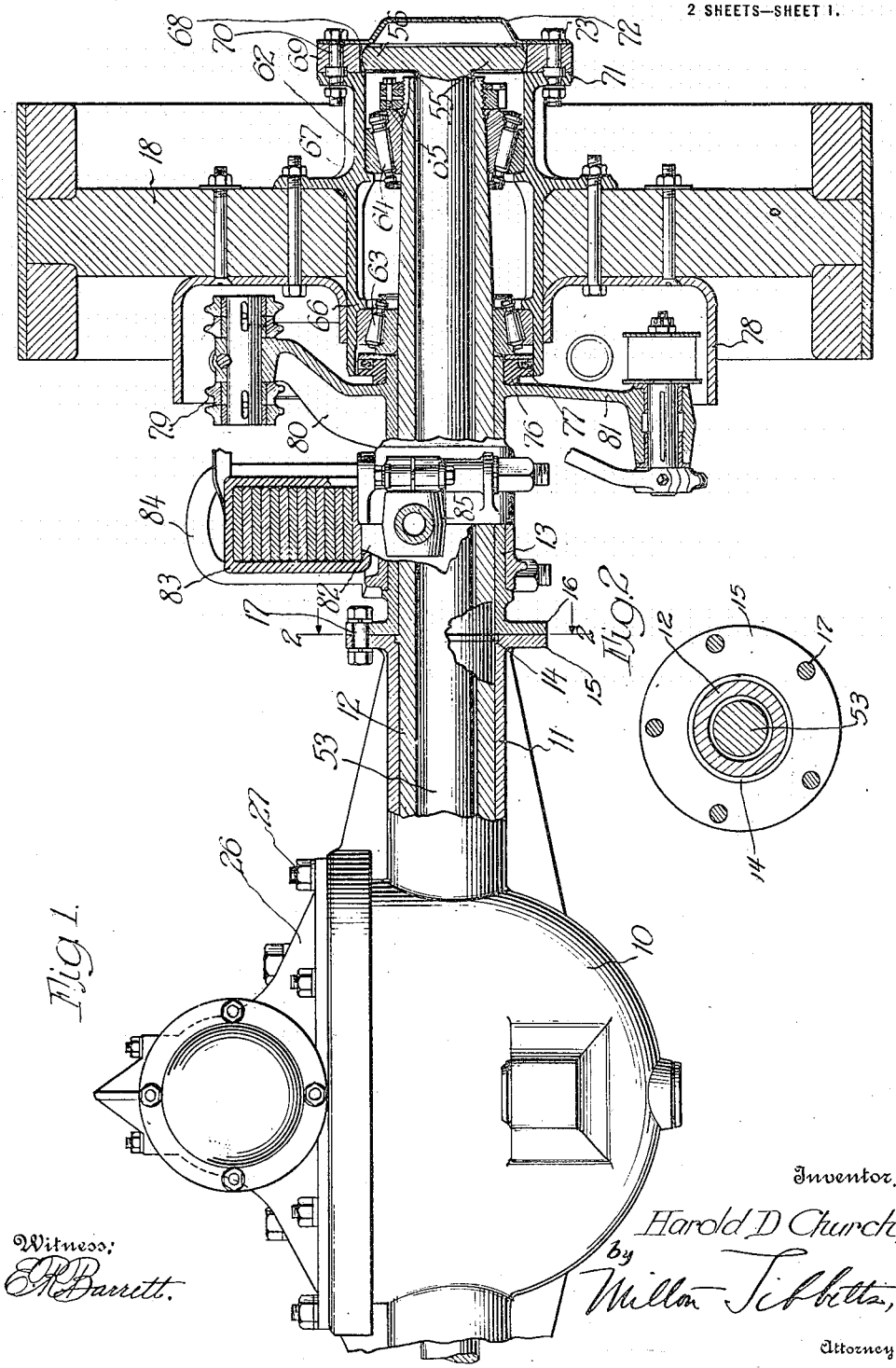

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,374,058.   Specification of Letters Patent.   Patented Apr. 5, 1921.

Application filed May 6, 1916. Serial No. 95,882.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles and particularly to the axle structure thereof.

One of the objects of the invention is to provide a built-up axle structure with particularly strong and sturdy characteristics. In the form of the invention shown the axle is particularly adapted for use on heavy commercial vehicles.

Another object of the invention is to provide a particularly strong and efficient driving connection between the driving axle sections and the wheels of the vehicle.

Other objects of the invention will appear from the following description taken in connection with the drawings which form a part of this specification, and in which—

Figure 1 is a vertical section and part elevation of an axle embodying this invention;

Fig. 2 is a transverse section on the line 2—2 of Fig. 1;

Figs. 3 and 4 are enlarged detail views of the driving plate; and

Figs. 5 and 6 are enlarged detail views of the outer end of one of the driving axle sections.

Referring to the drawings, the stationary built-up axle structure comprises five principal parts, the middle part 10 having alined tubular extensions 11, the two tubes 12, one for each of the extensions 11, and the two tubular pieces 13 which surround the outer parts of the tubes 12 and are secured to the middle part 10. Each tube 12 is shown as fitting tightly within one of the extensions 11 and as being provided with an annular flange 14 intermediate its ends and in contact with the outer end of the said extension 11. This flange positions the tube in the extension and the tubular piece 13 fitting snugly on the tube 12 and against the flange 14 holds the tube rigidly in place. The extension 11 and piece 13 have annular flanges 15 and 16 respectively, and bolts 17 secure these flanges together. With this very rigid construction the middle part of the axle 10 and the piece 13 may be castings and the tube 12 may be a heavy steel tube upon the outer end of which the wheel 18 is mounted.

Arranged axially within the tubes 12 and having their inner ends in withdrawable connection with the differential are a pair of driving axle sections 53. These axle sections 53 are entirely out of contact with the interior of the tubes 12, being supported at their inner ends entirely in the differential, and at their outer ends by the hubs of the wheels 18 as will be more particularly hereinafter described. As shown, the outer end of each of the axle sections 53 is formed with a head 55, shown in detail in Figs. 5 and 6. This head has a series of driving lugs 56 thereon, the lugs having flat driving sides 57 and a spherical surface 58 on their ends. Threaded openings 59 may be provided for attaching a puller device for withdrawing the axle section in case it should stick. The spherical surface 58 is well indicated in Figs. 5 and 6 by the radius lines 60 and 61, respectively.

The wheel 18 above referred to, has a hub 62 which is mounted in suitable separated bearings 63, 64, shown as tapered roller bearings, the inner bearing 63 abutting against the outer end of the tubular piece 13 and both bearings being held in place on the tube 12 by a suitably locked nut 65. The bearings are held in separated position by the flanges 66 and 67 interiorly of the hub 62.

The outer end of the hub 62 is formed with suitable driving recesses 68, and as shown these recesses are in a detachable plate 69 secured to the outer end of the hub proper. The securing means comprises a series of bolts 70 passing through the plate 69 and through a flange 71 on the end of the hub proper. Said bolts 70 also extend beyond the plate 69 and through suitable openings in a hub cap 72 which covers the end of the driving shaft section 53 and closes the outer end of the hub 62. Nuts 73 secure the hub cap in place.

The recesses 68 above referred to have suitable flat sides 74 which engage the flat surfaces 57 of the lugs 56 on the end of the driving shaft section, and the inner surface of each of the recesses 68 is of cylindrical form having the same radius, or substantially so, as the spherical surface 58 of each of the lugs 56. Thus, the lugs 56 have a working fit in the recesses 68 and the outer end of the shaft section is supported in this plate 69 and in particular it is centered by the spherical surfaces 58 on the lugs 56, contracting with the cylindrical surfaces 75 in the recesses 68. This, of course, makes a line contact between the axle section and the plate 69 for centering the axle and a large surface contact between the side surfaces of the lugs and of the recesses for communicating the driving effort from one point to the other. This line contact for centering the shaft is particularly advantageous in a heavy commercial vehicle construction because of the looseness that is inherently necessary in large bearings such as is shown in Fig. 1 of the drawings. The wheel 18 must necessarily have some small amount of weave relative to the tube 12 upon which it is mounted, and the slight relative movement that thereby results between the hub of the wheel and the driving shaft section 53 is readily taken care of by the construction illustrated and described.

Referring further to Fig. 1 it will be seen that the inner end of the hub 62 is closed by a suitable plate 76 and felt washer 77 mounted on the outer end of the tubular piece 13, thus preventing the leakage of oil or the entrance of dirt.

The wheel 18 is provided with a suitable brake drum 78 and brakes 79 coöperative therewith, being mounted on arms 80 and 81 shown as formed integral with the tubular piece 13. Intermediate the ends of said piece 13 the latter also supports a spring pad 82 upon which is mounted a spring 83 secured thereto by suitable spring clips 84. Suitable radius rods 85 may also be secured to the spring pad 82.

It will be understood that various changes and modifications may be made without departing from the spirit or scope of the invention.

Having thus described my invention, what I claim and desire to secure by Letters Patent is:—

1. In an axle, the combination with a stationary supporting structure, of a wheel mounted at the end thereof and having more than two driving recesses, and a driving shaft in said supporting structure having driving lugs adapted to fit said recesses, there being line contact only between the ends of said lugs and said recesses for centering said shaft.

2. In an axle, the combination with a stationary supporting structure, of a wheel mounted at the end thereof and having more than two driving recesses, and a driving shaft in said supporting structure having driving lugs adapted to fit said recesses, the ends of said lugs being of spherical form and the inner surfaces of said recesses being of cylindrical form.

3. In an axle, the combination with a stationary supporting structure, of a wheel mounted at the end thereof and having more than two driving recesses, and a driving shaft in said supporting structure having driving lugs adapted to fit said recesses, the ends of said lugs being of spherical form and the inner surfaces of said recesses being of cylindrical form of substantially the same radius as the spherical end of said lugs.

4. In an axle, the combination with a stationary supporting structure, of a wheel mounted on bearings at the end thereof, a driving axle section in said supporting structure and having driving lugs at its outer end, said lugs having spherical ends, and a driving plate secured to said wheel and having driving recesses therein, the lugs of said axle section being adapted to operate in said driving recesses.

5. In an axle, the combination with a stationary supporting structure, of a wheel mounted on bearings at the end thereof and having more than two driving recesses, the inner surfaces of said recesses forming sections of cylinders, and a driving axle section in said supporting structure and having driving lugs at its outer end, said lugs having spherical ends and arranged to operate in said recesses.

6. In an axle, the combination with a stationary supporting structure, of a wheel mounted on bearings at the end thereof and having more than two driving recesses, and a driving axle section in said supporting structure and having driving lugs at its outer end, said lugs and said recesses being so formed as to have a line contact between the ends of the lugs and the inner surface of the recesses.

7. In an axle, the combination with a stationary supporting structure, of a wheel mounted on separated coöperating roller bearings at the end of said structure, said wheel having a series of driving recesses formed in its hub, and a driving axle section in said supporting structure and having driving lugs adapted to enter said driving recesses in the wheel, said lugs and recesses being so formed as to permit slight universal movement between the wheel and the driving section while constantly maintaining line contact between the ends of the lugs and the inner surfaces of the recesses.

8. In an axle, the combination with a stationary supporting tube, of a wheel mounted on bearings on said tube and having a hub extending to the end of said tube, a driving axle section in said tube and having a head extending laterally to adjacent the hub end, and a substantially flat driving plate secured to the end of the hub and having a driving connection with the shaft head.

9. In an axle, the combination with a stationary supporting structure, of a wheel mounted on bearings at the end thereof, a driving plate at the outer end of the hub of said wheel, securing bolts extending through said plate and into the hub of said wheel for securing said plate to said hub, said bolts extending beyond said plate, a hub cap fitted over said plate and having openings for said bolt ends, nuts on said bolt ends securing said hub cap to the plate, and a driving axle section in said supporting structure and having a driving connection with said driving plate.

10. In combination, an axle having a stationary supporting structure, a wheel mounted on said supporting structure, a driving shaft mounted in said supporting structure, and a driving connection between said shaft and said wheel, comprising driving lugs carried by one of said members, and driving recesses formed on the other member, the ends of the lugs being of spherical form with the center of the sphere approximately in the axis of the shaft and the inner surfaces of the recesses being cylindrical in form.

In testimony whereof I affix my signature.

HAROLD D. CHURCH.